United States Patent [19]
Izutani et al.

[11] Patent Number: 6,082,338
[45] Date of Patent: Jul. 4, 2000

[54] EVAPORATION FUEL TREATING DEVICE FOR AN INTERNAL COMBUSTION ENGINE

[75] Inventors: Takahide Izutani; Akinori Osanai, both of Susono, Japan

[73] Assignee: Toyota Jidosha Kabushiki Kaisha, Toyota, Japan

[21] Appl. No.: 09/119,070

[22] Filed: Jul. 9, 1998

[30] Foreign Application Priority Data

Jul. 14, 1997 [JP] Japan ..................................... 9-188793

[51] Int. Cl.$^7$ ................................................. F02M 33/04
[52] U.S. Cl. ........................................ 123/520; 123/90.15
[58] Field of Search .................................. 123/516, 518, 123/519, 520, 90.15, 90.16

[56] References Cited

U.S. PATENT DOCUMENTS 5,215,061  6/1993  Ogawa ................................. 123/90.15
5,690,065  11/1997  Van Vuuren ........................ 123/90.15

FOREIGN PATENT DOCUMENTS 5-156973  6/1993  Japan .
9-72254  3/1997  Japan .

*Primary Examiner*—Thomas N. Moulis
*Attorney, Agent, or Firm*—Oliff & Berridge, PLC

[57] ABSTRACT

In an evaporated fuel treatment device for an internal combustion engine, various parameters indicating that an engine is currently in a state where a fuel vapor is generated from a fuel tank are detected from moment to moment to estimate in advance that the amount of the fuel vapor is generated more than a capacity of the canister. Then, the purge from the canister is promoted on the basis of that estimation so that the fuel vapor of more than the capacity of canister is prevented from being adsorbed by the canister. With this structure, the overflow of the fuel vapor from the canister is prevented, and also the evaporative emission is suppressed.

15 Claims, 13 Drawing Sheets

【図12】

【図13】

EVAPORATION FUEL TREATING DEVICE FOR AN INTERNAL COMBUSTION ENGINE

BACKGROUND OF THE INVENTION

1. Field of the Invention

The present invention relates to an evaporated fuel treatment device for an internal combustion engine.

2. Description of the Related Art

As a device for reducing an evaporation fuel which is permitted to be naturally evaporated from a fuel system, particularly a fuel tank, to the atmosphere for an internal combustion engine, there is an fuel vapor discharge suppressing device. In the fuel vapor discharge suppressing device of this type, an activated carbon canister is generally employed.

The activated carbon canister includes a vessel in which activated carbon is accumulated, and is designed in such a manner that, for example, when an internal combustion engine is stopped, the fuel vapor generated from the fuel system is introduced into the vessel so as to be adsorbed by the activated carbon. The fuel vapor discharge suppressing device is communicated with a inlet passage of the internal combustion engine so that the fuel vapor adsorbed by the activated carbon is attracted to the inlet passage from the activated carbon by a negative pressure in the inlet passage when the internal combustion engine is operated and then purged. The fuel vapor thus purged is burned together with air-fuel mixture. The activated carbon thus purged is recovered in adsorption capacity, and repeatedly functions.

In the recent years, an internal combustion engine having a variable valve timing mechanism has been spread, and there is proposed that the above-mentioned fuel vapor discharge suppressing device is applied to this internal combustion engine.

The variable valve timing mechanism is designed, as well known, so as to adjust a valve overlapped amount by varying an open/close timing of at least an intake valve among the inlet and exhaust valves according to the r.p.m. of the engine, as a result of which since the intake air flow into a combustion chamber is adjusted to enable the pumping loss to be reduced, a pressure in the inlet passage approaches the atmospheric pressure from the negative pressure. This makes it difficult to function the fuel vapor discharge suppressing device that employs the negative pressure in the inlet passage, and there is a worriment that the fuel vapor could not be purged from the canister. Therefore, in that case, it is estimated that the fuel vapor is overflowed from the canister, to thereby deteriorate the evaporative emission.

In order to cope with the above defect, there has been disclosed, for example, in Japanese Patent Unexamined Publication No. Hei 5-156973, an evaporated fuel treatment device for an internal combustion engine which is designed in such a manner that the fuel vapor can be purged even if the variable timing mechanism is operated in the case where the fuel vapor discharge suppressing device is applied to the internal combustion engine having the above variable value timing mechanism.

The fuel vapor treating device for the internal combustion engine of this type is designed such that the close timing of the intake valve is advanced, that is, the close timing of the intake valve is hastened to promote the negative pressure state in the inlet passage, thereby surely performing the purge from the canister to the inlet passage.

However, this device is structured such that the close timing of the intake valve is not spark-advanced until a predetermined condition for execution of the purge (purge execution condition) is satisfied under the condition where the canister evaporation adsorbs a predetermined amount or more of the fuel vapor. For that reason, in the case where the internal combustion engine is put in the condition where the fuel vapor is remarkably liable to occur, it is largely estimated that the amount of the generated fuel vapor is larger than the amount of purge. Assuming such a case, the above-described predetermined amount of the canister is usually set to be smaller than the maximum capacity of the canister. However, the canister is soon filled with the adsorbed fuel vapor, as a result of which there is a risk that the fuel vapor is overflowed from the canister.

SUMMARY OF THE INVENTION

The present invention has been made in view of the above circumstances, and therefore an object of the present invention is to provide an evaporated fuel treatment device for an internal combustion engine in which various parameters that can be indicative that an internal combustion engine is in a state where an fuel vapor can occur are detected at times to estimate beforehand that the mount of purge tends to increase, and the purge is promoted on the basis of that estimate so that the fuel vapor of a predetermined amount or more is prevented from being adsorbed by the canister, to thereby prevent overflow as well as to suppress the evaporative emission.

In order to achieve the above object, an evaporated fuel treatment device for an internal combustion engine of the present invention is structured as follows.

(1) The evaporated fuel treatment device for an internal combustion engine according to this invention is comprising: a variable valve timing mechanism that varies the open/close timing of at least an intake valve among the intake valve and an exhaust valve of the internal combustion engine; operation state detecting means for detecting the operation state of the internal combustion engine; drive control means for calculating the amount of valve overlap of the intake valve and the exhaust valve on the basis of a detection result of the operation state detecting means to control the drive of the variable valve timing mechanism according to the amount of the calculated valve overlap; purge executing means for purging the fuel vapor discharged from a fuel system of the internal combustion engine to an inlet passage in response to the state of operation of the internal combustion engine; fuel vapor increase tendency detecting means for detecting before or during executing purge by the purge executing means a parameter indicative that the amount of generation of the fuel vapor discharged from the fuel system tends to increase, among parameters indicative of the operation state detected by the operation state detecting means; and valve overlap amount correcting means for correcting the amount of valve overlap calculated by the drive control means according to the parameter detected by the fuel vapor increase tendency detecting means.

In the fuel vapor treating device for an internal combustion engine according to the present invention, the valve overlap amount correcting means corrects the valve overlap amount according to the parameter detected by the fuel vapor increase tendency detecting means which represents that the amount of generation of the fuel vapor discharged from the fuel system tends to increase.

In other words, when the parameter detected by the fuel vapor increase tendency detecting means represents that the amount of generation of the fuel vapor in the fuel system tends to increase, the valve overlap amount correcting means corrects the amount of valve overlap so that the open timing of the intake valve is at least lagged. Hence, at the time that the fuel vapor increase tendency detecting means detects that the amount of generation of fuel vapor in the fuel system tends to increase, a negative pressure generated in the inlet passage is boosted.

When, for example, a canister is applied to the fuel vapor treating device for an internal combustion engine according to the present invention so that the fuel vapor from the fuel system is temporarily adsorbed by the canister, because the negative pressure generated in the inlet passage is boosted at the time that the fuel vapor increase tendency detecting means detects that the amount of generation of fuel vapor in the fuel system tends to increase as described above, the fuel vapor can be purged from the canister by the purge executing means before the canister is saturated with the fuel vapor.

Accordingly, there is no case where the canister adsorbs the fuel vapor more than that saturated capacity, and therefore there is no fear that the canister is caused to be overflown.

(2) In the device of (1) described above, the parameter indicating that the amount of the generated fuel vapor tends to increase may be a parameter indicating a state in which the fuel vapor is generated in a fuel tank of the fuel system.

(3) In the device of (1) described above, the above parameter may be a parameter relating to an amount of the purge.

(4) In the device of (1) described above, the purge executing means may comprise a purge passage for directing the evaporated fuel generated in the fuel tank to the intake passage of the internal combustion engine, and a purge control valve to close and open the purge passage for controlling the amount of purge based on the operating state of the internal combustion engine.

(5) In the device of (3) described above, the parameter relating to the state of amount of purge is preferably including at least one of a purge ratio, a vapor concentration, a purge gas amount, a fuel correction amount by purging, and a period of time during which the purge is executed.

(6) In the device of (4) described above, a canister, which temporarily adsorbs the evaporation fuel emitted from the fuel tank, is interposed between the fuel tank and the intake passage of the internal combustion engine, said canister is communicated with the intake passage through the purge passage, and the canister is communicated with the fuel tank through an introducing passage which leads the evaporated fuel emitted from the fuel tank to the canister.

(7) In the device of (1) described above, the purge executing means effects the purging of the evaporated fuel emitted from the fuel tank into the intake passage by employing a negative pressure generated in the intake passage.

(8) In the device of (2) described above, the parameter that represents the state, in which the fuel vapor is generated in the fuel tank, is detected by tank state detection means for detecting the state of the fuel tank.

(9) In the device of (8) described above, the tank state detecting means includes at least one of a G sensor for sensing a degree of shaking of the fuel tank, a fuel tank temperature sensor for detecting a temperature in the fuel tank, a fuel remainder sensor for detecting the fuel remainder in the fuel tank, and an outside air temperature sensor for detecting the outside air temperature.

(10) In the device of (1) described above, the amount of purge effected by the purge executing means may be controlled based on a purge ratio which is a volume flow ratio of the purge gas flow to the total intake air flow.

(11) In the device of (1) described above, the valve overlap amount is set based on a displacement angle which is calculated on the basis of the operating state of the internal combustion engine.

(12) In the device of (11) described above, the displacement angle is preferably corrected based on an engine temperature.

(13) In the device of (11) described above, the displacement angle may be calculated from at least an engine revolutions speed and a degree of open of the throttle.

(14) In the device of (1) described above, wherein, when the parameter detected by said evaporation fuel increase tendency detecting means indicates that the amount of generation of the evaporation fuel tends to increase, it is preferable that the valve overlap amount is corrected by a valve overlap amount correction means so as to lag the open timing of the air intake valve.

(15) In the device of (1) described above, wherein, when the increase of evaporation fuel is detected by the fuel vapor increase tendency detecting means, it is preferable that the valve overlap amount correcting means corrects the amount of valve overlap of the intake valve and the exhaust valve so that the overlap amount is made smaller.

BRIEF DESCRIPTION OF THE DRAWINGS

The object and features of the present invention will become more apparent from the consideration of the following detailed description taken in conjunction with the accompanying drawings in which.

DETAILED DESCRIPTION OF THE PREFERRED EMBODIMENTS

Figure 1:
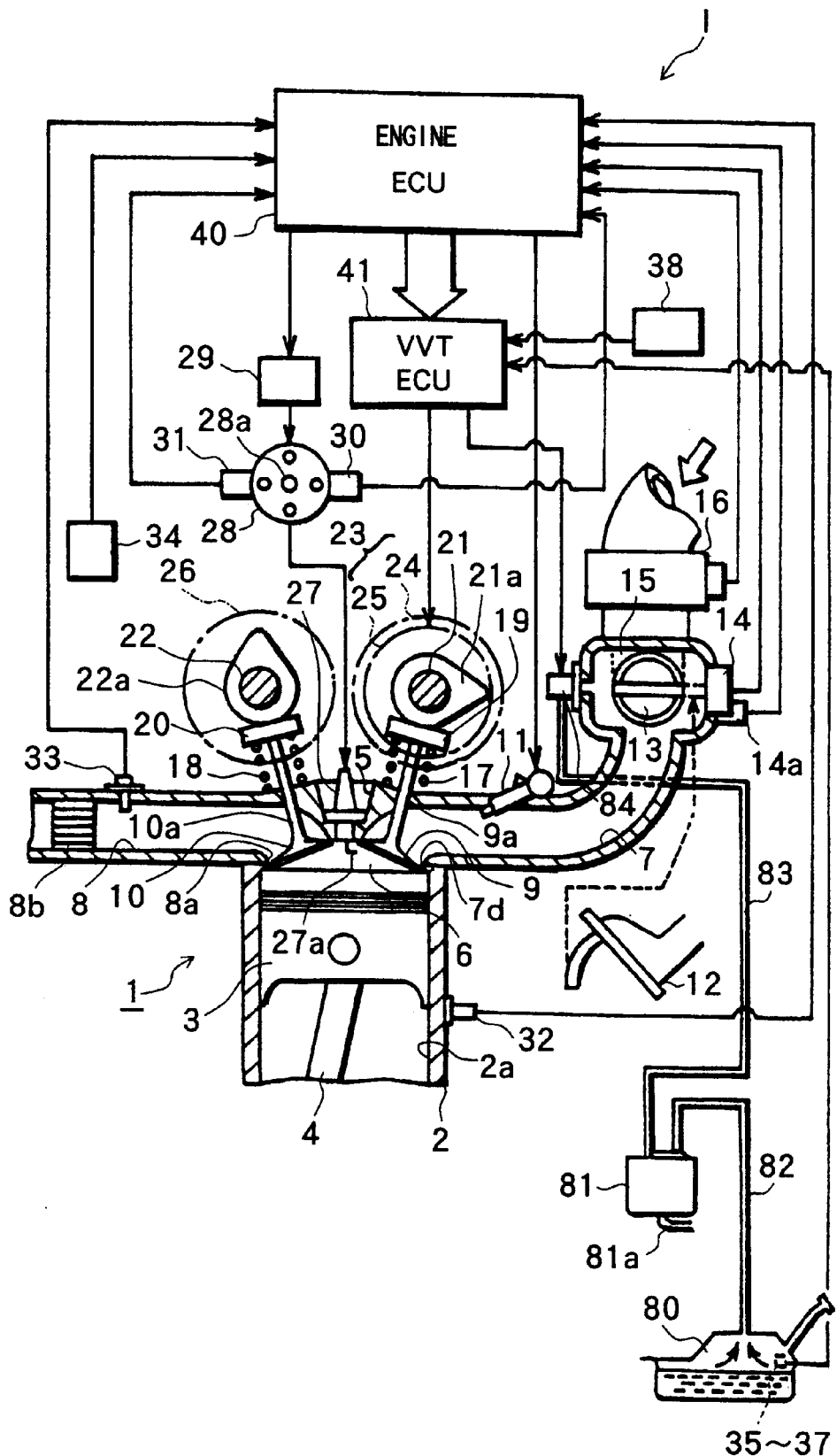
FIG. 1 is a conceptually structural diagram showing a gasoline engine to which an evaporated fuel treatment device for an internal combustion engine according to the present invention is applied.

Now, a description will be given in more detail of preferred embodiments of the present invention with reference to the accompanying drawings.

Description of the Structure of a Device

A piston 3 is vertically movably disposed in a cylinder bore 2a formed in a cylinder block 2 of a gasoline engine 1 as an internal combustion engine. For convenience of description, the cylinder bore 2a and the piston 3 are shown for only one cylinder. Also, the piston 3 is coupled with a crank shaft not shown through a con'rod 4.

A combustion chamber 6 is defined by a space surrounded by the piston 3, the cylinder bore 2a and a cylinder head 5 covering a portion above the bore 2a.

A inlet passage 7 and an exhaust passage 8 are provided to communicate with the combustion chamber 6, and a intake valve 9 for open/close is equipped in a inlet port 7a that is opened to the combustion chamber 6 of the inlet passage 7, and an exhaust valve 10 for open/close is equipped in an exhaust port 8a that is opened to the combustion chamber 6 of the exhaust passage 8.

An external air is introduced into the inlet passage 7 through an air cleaner not shown, and an injector 11 for fuel injection is disposed in the vicinity of the inlet port 7a. The injector 11 injects the fuel from the fuel tank 80 that constitutes the fuel system to the inlet passage 7 by a fuel pump not shown.

A mixture gas consisting of the injected fuel and the external air is introduced into the combustion chamber 6 through the inlet port 7a when the intake valve 9 is opened. The mixture gas introduced into the combustion chamber 6 is burned, and with a high pressure produced at this time, the piston 3 moves down within the cylinder bore 2a, and rotates the crank shaft through the con'rod 4.

Also, the combustion gas generated during the combustion is exhausted to the exterior from the exhaust port 8a through the exhaust passage 8 when the exhaust valve 10 is opened.

A throttle valve 13 that opens and closes in cooperation with the operation of an accelerator pedal 12 is disposed on the way of the inlet passage 7. The intake air flow Ga into the inlet passage 7 is adjusted by the open/close operation of the throttle valve 13.

In the vicinity of the throttle valve 13 are disposed a throttle sensor 14 for detecting the throttle opening degree TA and a totally-closed switch 14a which is turned on when the throttle valve 13 is at a totally-closed position to output a totally-closed signal LL. Also, a serge tank 15 for smoothing the surging of the sucked air is disposed downstream of the throttle valve 13. Further, a known air flow meter 16 that detects the intake air flow Ga which is taken in the inlet passage 7 from the exterior is disposed upstream of the throttle valve 13.

Subsequently, a valve gear mechanism by which the intake valve 9 and the exhaust valve 10 are operated will be described.

The intake valve 9 and the exhaust valve 10 have stems 9a and 10a hat extend upward, respectively, and structural parts such as valve springs 17, 18 and valve lifters 19, 20, etc., are assembled with the upper portions of the stems 9a and 10a, respectively.

Cams 21a and cams 22a are disposed on top surfaces of the valve lifter 19 and the valve lifter 20, correspondingly. The cams 21a and the cams 22a, the number of which corresponds to the number of cylinders, are disposed on a inlet-side cam shaft 21 and an exhaust-side cam shaft 22 which are supported by the cylinder head 5, respectively.

The intake valve 9 and the exhaust valve 10 are always urged upward by the spring force of a valve spring 17 and a valve spring 18 so as to close the inlet port 7a and the exhaust port 8a. In an urging state, the top edges of the respective stems 9a and 10a are always abutted against the cams 21a and 22a through the valve lifters 19 and 20. Also, with the action of the cams 21a and the cams 22a against the spring force, the intake valve 9 and the exhaust valve 10 are moved in a direction along which the inlet port 7a and the exhaust port 8a are opened, respectively.

Also, a timing pulley ache 24 and a step motor 25 which structure a variable valve timing mechanism (VVT) 23 so as to vary the open/close timing of only the intake valve 9 are disposed at a top portion of the cam shaft 21 at the inlet side. The intake air flow Ga into the combustion chamber 6 can be adjusted with a variation of the open/close timing of the intake valve 9 by the variable valve timing mechanism 23, other than the open/close operation of the throttle valve 13.

The step motor 25 includes a plurality of electromagnetic coils from which an electromagnetic coil to be excited is sequentially selected to rotate every one step in a predetermined direction.

Contrary to the inlet-side cam shaft 21, the top portion of the exhaust-side cam shaft 22 is provided without the variable valve timing mechanism 23 but with only a timing pulley 26. However, like the inlet-side cam shaft 21, the variable valve timing mechanism 23 may be disposed on the exhaust-side cam shaft 22 so that the open/close timing of the exhaust valve 10 gets variable.

Also, the timing pulley ache 24 in the variable valve timing mechanism 23 on the inlet-side cam shaft 21 and the timing pulley 26 on the exhaust-side cam shaft 22 are drivingly coupled with a timing pulley of the crank shaft through a timing belt not shown. Therefore, when a motive power is transmitted to the timing pulley ache 24 and the timing pulley 26 from the crank shaft through the timing belt at the time of operating the engine 1, the respective cam shafts 21 and 22 are rotationally driven, and the respective cams 21a and 22a mounted on those shafts 21 and 22 are also rotated. Also, the respective valve lifters 19 and 20 are pressed against the spring force of the valve springs 17 and 18 according to the profiles of the cams 21a and 22a, whereby the intake valve 9 and the exhaust valve 10 are moved downward to open the inlet port 7a and the exhaust port 8a, respectively.

The fundamental open/close timings of the intake valve 9 and the exhaust valve 10 are set in advance relative to four strokes of the piston 3 which are conducted during two revolutions of the crank shaft, that is, up and down movements of the piston 3 accompanied by an intake stroke, a compression stroke, a combustion stroke and an exhaust stroke. In this situation, when the inlet port 7a is opened with the down movement of the piston 3 in the intake stroke, that is, when the intake valve 9 is moved to the bore 2a side, the air-fuel mixture is sucked into the combustion chamber 6. Also, when the exhaust port 8a is opened with the up movement of the piston 3 within the cylinder in the exhaust stroke, that is, when the exhaust valve 10 is moved to the bore 2a side, a combustion gas is exhausted from the combustion chamber 6 to the exhaust passage 8.

Then, the variable valve timing mechanism 23 is designed so as to vary the basic open/close timing of the intake valve 9 according to the operation state of the engine 1 at times, as a result of which the rotation phase of the cams 21a at the inlet side is appropriately varied according to the operation state of the engine 1. In other words, the variable valve timing mechanism 23 is designed to vary the intake timing of the air-fuel mixture into the combustion chamber 6. The basic open/close timing of the intake valve 9 is varied by the variable valve timing mechanism 23, thereby being capable of varying the amount of valve overlap of the intake valve 9 and the exhaust valve 10.

In order to burn the air-fuel mixture introduced into the combustion chamber 6, an ignition plug 27 is fixed to the cylinder head 5 situated in the center of the cylinder, and a discharge section 27a of the ignition plug 27 is confronted by the inside of the combustion chamber 6. The ignition plug 27 ignites on the basis of an ignition signal distributed by a distributer 28.

The distributer 28 is designed to distribute a high voltage from an ignitor 29 to the ignition plug 27 in synchronism with the crank angle of the engine 1.

The distributer 28 includes a rotor 28a that rotates in cooperation with the rotation of the engine 1. The distributer 28 also includes an r.p.m. sensor 30 that detects the r.p.m. NE of the engine according to the rotation of the rotor 28a. Further, the distributer 28 includes a cylinder discrimination sensor 31 that detects a crank angle reference position of the engine 1 at a predetermined rate according to the rotation of the rotor 28a to output its reference position signal.

The throttle sensor 14, the totally-closed switch 14a, the air flow meter 16, the r.p.m. sensor 30 and the cylinder discrimination sensor 31 as described above constitute the operation state detecting means for detecting the operation state of the engine 1. Also, as other operation state detecting means, a water temperature sensor 32 that detects a temperature thw of a cooling water for the engine 1 is provided in the cylinder block 2, a catalyzer 8b is provided on the way of the exhaust passage 8, and an oxygen sensor 33 that detects the oxygen concentration Ox in the exhaust gas is disposed upstream of the catalyzer. Moreover, there is provided a vehicle speed sensor 34 that detects a travel speed SP of the vehicle as vehicle speed detecting means. The vehicle speed sensor 34 is mounted on a transmission not shown and driven by the rotation of the transmission gears.

The throttle sensor 14, the totally-closed switch 14a, the air flow meter 16, the r.p.m. sensor 30, the cylinder discriminating sensor 31, the water temperature sensor 32, the oxygen sensor 33 and the vehicle speed sensor 34 are electrically connected to the input side of an engine electric control unit (ENGECU) 40.

Also, the above-described injector 11, ignitor 29 and an ECU (VVTECU) 41 for the variable valve timing mechanism as drive control means for controlling the drive of the variable valve timing mechanism 23 etc., are electrically connected to the output side of the engine electric control unit 40.

Furthermore, a G sensor 35 that senses the degree of shaking G of the fuel in the fuel tank 80 during the operation of the engine 1, a fuel tank temperature sensor 36 for detecting a temperature T (tank) within the fuel tank 80, a fuel remainder sensor 37 that detects a fuel remainder Gas, and an outside air temperature sensor 38 that detects an outside air temperature T(out) are mounted on the fuel tank and other appropriate portions, respectively, so that those sensors also function as the operation state detecting means.

Of the respective parameters indicating the operation states detected by those operation state detecting means, the respective parameters detected by the G sensor 35, the fuel tank temperature sensor 36, the fuel remainder sensor 37 and the outside air temperature sensor 38 are parameters indicating that the amount of generated fuel vapor discharged from the fuel tank 80 tends to increase, in other words, indicating a state in which whether the fuel tank is in the condition of generating the fuel vapor, namely, indicating the current state of the fuel tank. Hence, in the present specification, the G sensor 35, the fuel tank temperature sensor 36, the fuel remainder sensor 37 and the outside air temperature sensor 38 are called fuel vapor increase tendency detecting means or tank state detection means. As other parameters indicating that the amount of generated fuel vapor tends to increase, there is a parameter relating to a state of amount of purge. As the parameters relating to the state of purge amount, there are a purge ratio pgr (%) which is a volume flow ratio of the purge gas flow Gp to the total intake air flow Ga, a fuel correction amount fpg by purge, and a vapor concentration fgpg per unit purge ratio. Those three parameters have the following relationship.

$$fpg = fgpg \cdot pgr$$

Those parameters relating to the purge are calculated by the ECU 41 for the variable valve timing mechanism through a known calculating method disclosed, for example, in Japanese Patent Laid-Open Publication No. Hei 7-305662. Another parameter relating to the state of amount of purge, there is the period of time during which the purge is being executed.

The engine electronic control unit 40 appropriately controls the injector 11 and the ignitor 29 on the basis of the output signals from the totally-closed switch 14e, the air flow meter 16 and the respective sensors 14, 30 to 34. In other words, the engine electronic control unit 40 is a control unit that mainly takes charge of the fuel injection amount control, the ignition timing control, and so on of the engine 1. Also, an engine load is calculated according to the degree of opening of the throttle valve 13 by the engine electronic control unit 40. The degree of the engine load is also a parameter indicating the operation state of the engine 1.

The engine electronic control unit 40 also appropriately controls the ECU 41 for the variable valve timing mechanism on the basis of the output signals from the totally-closed switch 14a, the air flow meter 16 and the respective sensors 14, 30–34 other than the injector 11 and the ignitor 29.

Figure 3:
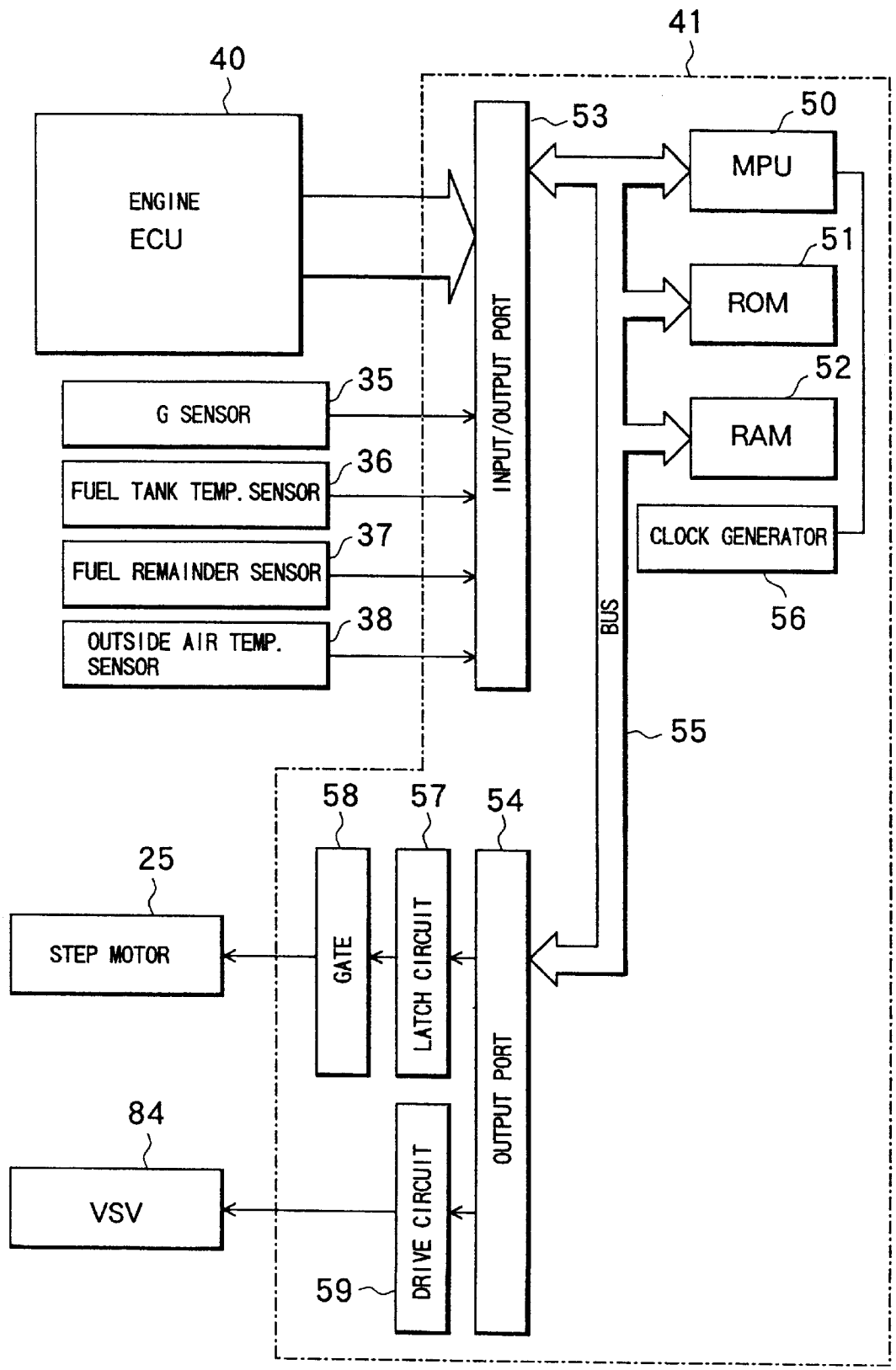
FIG. 3 is a block diagram showing an electric structure of an ECU for a variable valve timing mechanism.

The ECU 41 for the variable valve timing mechanism is electrically connected, at an input side thereof, to the G sensor 35, the fuel tank temperature sensor 36, the fuel remainder sensor 37 and the outside temperature sensor 38 in addition to the engine electronic control unit 40, as shown in FIG. 3.

The ECU 41 for the variable valve timing mechanism calculates the valve overlap amount on the basis of the parameters (detection results) detected by the output signals from the totally-closed switch 14a, the air flow meter 16 and the respective sensors 14, 30 to 34. Then, the ECU 41 for the variable valve timing mechanism controls the rotating direction and the rotating amount of the output shaft of the step motor 25 on the basis of the calculation results to control the drive of the variable valve timing mechanism 23. Also, the ECU 41 for the variable valve timing mechanism corrects the calculation value of the valve overlap amount according to the output signals from the sensors 35 to 38, that is, the degree of shaking G of the fuel, the fuel tank temperature T(tank), the fuel remainder Gas and the outside air temperature T(out) to make the state more appropriate.

For that reason, in the present specification, the ECU 41 for the variable valve timing mechanism is also called valve overlap amount (calculation value) correcting means.

Thus, the ECU 41 for the variable valve timing mechanism functions as the control means for controlling the drive of the variable valve timing mechanism 23 on the basis of the calculation result of the valve overlap amount, and also as the valve overlap amount correcting means for correcting the calculated valve overlap amount.

The ECU 41 for the variable valve timing mechanism decides an optimum valve overlap amount responsive to the operation state of the engine 1 at times on the basis of the respective various data signals inputted thereto, etc., and outputs a valve timing control signal used for appropriately controlling the step motor 25 to the step motor 25 from its output side as shown in FIG. 3.

The canister 81 is designed to adsorb the fuel vapor discharged from the fuel tank 80 temporarily, and the canister 81 and the fuel tank 80 are connected to each other through an introduction passage 82. For example, when the engine 1 is stopped, the fuel vapor generated from the fuel tank 80 is introduced to the canister 81 through the introduction passage 82, and then adsorbed by the canister temporarily. The canister 81 structures the fuel vapor discharge suppressing unit that reduces the discharge of the fuel vapor from the fuel tank 80 to the atmosphere, and stores the activated carbon for fuel vapor adsorption therein.

In order to purge the fuel vapor adsorbed by the canister 81 temporarily from the activated carbon and introduce it to the inlet passage 7, the surge tank 15 is connected with a purge passage 83 that extends from the canister 81 to the inlet passage 7. The canister 81 is equipped with an atmosphere passage 81a opened to the atmosphere.

A vacuum switching valve (VSV) 84 serving as a purge control valve is disposed between the purge passage 83 and the surge tank 15. The vacuum switching valve (VSV) 84 is of the electromagnetic two-way valve, and its drive is controlled by the ECU 41 for the variable valve timing mechanism. Opening and closing between the purge passage 83 and the surge tank 15 is conducted by the operation of the vacuum switching valve (VSV) 84.

The vacuum switching valve 84 is opened in an on-state and permits the purge passage 83 and the surge tank 15 to communicate with each other. On the contrary, the vacuum switching valve 84 is closed in an off-state and isolates the communication of the purge passage 83 and the surge tank 15.

During the operation of the engine 1, when the vacuum switching valve 84 is opened by the duty control, the fuel vapor adsorbed by the canister 81 temporarily is purged by a negative pressure generated downstream of the throttle valve 13. The fuel vapor purged from the canister 81 is directed to the surge tank 15 via the purge passage 83 and the vacuum switching valve 84.

The purge passage 83 and the vacuum switching valve 84 thus structured also serves as the structural element of the purge executing means together with the ECU 41 for the variable valve timing mechanism.

Also, the ECU 41 for the variable valve timing mechanism controls the drive of the variable valve timing mechanism 23 on the basis of the data signal of the degree of shaking G of the fuel, the fuel tank temperature T(tank), the fuel remainder Gas and the outside air temperature T(out), so that the open timing of the intake valve 9 is lagged, thereby the amount of valve overlap of the intake valve and the exhaust valve is corrected to be smaller.

The fuel vapor purged by the surge tank 15 is burned together with the air-fuel mixture that enters the combustion chamber 6 through the inlet passage 7. When the fuel vapor of a certain degree is purged from the canister 81, the activated carbon restores the capacity of adsorbing the fuel vapor from the fuel tank 80 again.

Subsequently, the structure of the engine electronic control unit 40 and the ECU 41 for the variable valve timing mechanism as described above will be described with reference to the block diagrams shown in FIGS. 2 and 3.

Figure 2:
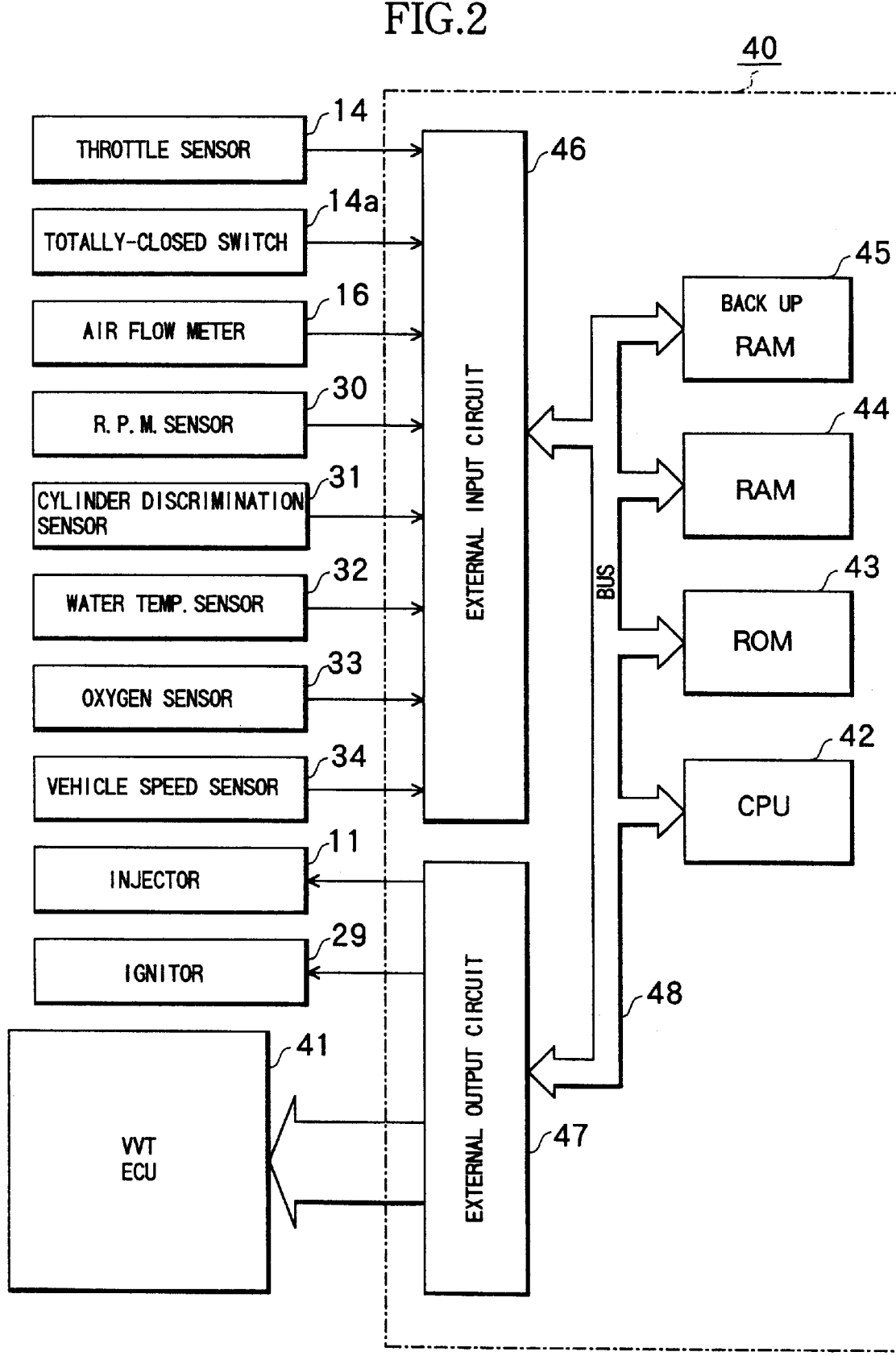
FIG. 2 is a block diagram showing an electric structure of an engine ECU.

First, as shown in FIG. 2, the engine electronic control unit 40 is structured as a theoretical arithmetic operation circuit comprising of a central processing unit (PCU) 42, a read only memory (ROM) 43 that stores predetermined control program and so on therein in advance, a random access memory (RAM) 44 that stores temporarily the calculation results, etc., of the central processing unit 42 therein, a backup RAM 45 that latches data stored in advance, an external input circuit 46, and an external output circuit 47. Those respective part are connected through a bus 48.

The external input circuit 46 is connected with the throttle sensor 14, the totally-closed switch 14a, the air flow meter 16, the r.p.m. sensor 30, the cylinder discriminating sensor 31, the water temperature sensor 32, the oxygen sensor 33 and the vehicle speed sensor 34 described above, respectively. On the other hand, the external output circuit 47 is connected with the injector 11, the ignitor 29 and the ECU 41 for the variable valve timing mechanism, respectively.

The central processing unit 42 reads the signals from the totally-closed switch 14a, the air flow meter 16 and the respective sensors 14 and 30 to 34, etc., which are inputted through the external input circuit 46 as input values. When the input values are read, the external input circuit 46 subjects the input values from the throttle sensor 14, the air flow meter 16, the water temperature sensor 32 and the oxygen sensor 33 to analog-to-digital conversion processing. Also, the external input circuit 46 subjects the input values from the r.p.m. sensor 30, the cylinder discriminating sensor 31, the vehicle speed sensor 34 and so on to waveform shaping processing. The central processing unit 42 appropriately controls the injector 11, the ignitor 29 and so on the basis of the input values read from the totally-closed switch 14a, the air flow meter 16, the respective sensors 14, 30 to 34, etc.

The central processing unit 42 outputs to the ECU 41 for the variable valve timing mechanism through the external output circuit 47 as the data signal, the throttle opening degree TA, the totally-closed signal LL, the intake air flow Ga, the engine r.p.m. NE, the oxygen concentration Ox, the vehicle speed SP and so on among the signals read as input values from the totally-closed switch 14a, the air flow meter 16, the respective sensors 14, 30 to 34 and so on via the external input circuit 46.

Then, as shown in FIG. 3, the ECU 41 for the variable valve timing mechanism is structured as a theoretical arithmetic operation circuit comprising of a microprocessing unit (MPU) 50, a read only memory 51 that stores predetermined control program and so on for the variable valve timing mechanism 23, etc., therein in advance, a random access memory 52 that temporarily stores the calculation results, etc., of the microprocessing unit 50 therein, etc., an input/output port 53 and an output port 54. Those respective part are connected through a bus 55.

Also, the ECU 41 for the variable valve timing mechanism includes a clock generator 56 that generates periodic clock pulses, and supplies the clock pulses to the microprocessing unit 50 from the generator 56.

Further, the ECU 41 for the variable valve timing mechanism includes a latch circuit 57, a gate 58 and a drive circuit 59 which are connected to the output port 54.

The input/output port 53 is connected to the engine electronic control unit 40.

Also, the input/output port 53 is connected with the G sensor 35, the fuel tank temperature sensor 36, the fuel remainder sensor 37 and the outside temperature sensor 38.

Further, the gate 58 is connected with the step motor 25, and the drive circuit 59 is connected with the vacuum switching valve 84.

The microprocessing unit 50 reads the signals such as the throttle opening degree TA, the totally-closed signal LL, the engine r.p.m. NE, and the vehicle speed SP which are inputted to the unit 50 through the input/output port 53 from the engine electronic control unit 40 as input values, and appropriately controls the step motor 25 on the basis of the read input value. In other words, the microprocessing unit 50 calculates and decides a rotating direction and the number of steps of the step motor 25 according to the control program stored in the read only memory 51 on the basis of the input values read therein. Then, the microprocessing unit 50 outputs the calculation result to the latch circuit 57 through the output port 54 as the valve timing control signal.

Upon receiving the valve timing control signal, the latch circuit 57 outputs the open/close command to the gate 58 according to a predetermined sequence. Then, the gate 58 selects an electromagnetic coil to be magnetized and drives the step motor 25 according to the open/close command.

Also, the microprocessing unit 50 reads the signals such as the throttle opening degree TA, the totally-closed signal LL, the intake air flow Ga, the engine r.p.m. NE, the oxygen concentration Ox, and so on which are inputted through the input/output port 53 as input values, and appropriately controls the vacuum switching valve 84 on the basis of the input value read therein. In other words, the microprocessing unit 50 judges condition under which the fuel vapor adsorbed by the canister 81 is to be purged according to the control program stored in the read only memory 51 on the basis of the input values read by the unit 50. Then, unit 50 calculates the purge ratio pgr (%), a vapor concentration fgpg per unit purge ratio, and the fuel correction amount fpg by purge, etc., as described above, on the basis of the input value read therein. Also, according to this result, the unit 50 opens and closes the vacuum switching valve 84 through the drive circuit 59.

Of the above-described structure, what includes at least the variable valve timing mechanism 238 and tensors 30 to 38 and the ECU 41 for the variable valve timing mechanism is an evaporated fuel treatment device I for an internal combustion engine according to the present invention.

Subsequently, the control routine of the variable valve timing mechanism (VVT control routine) for controlling the drive of the variable valve timing mechanism 23 will be described sequentially every step stated below with reference to FIGS. 4 and 5.

Figure 4:
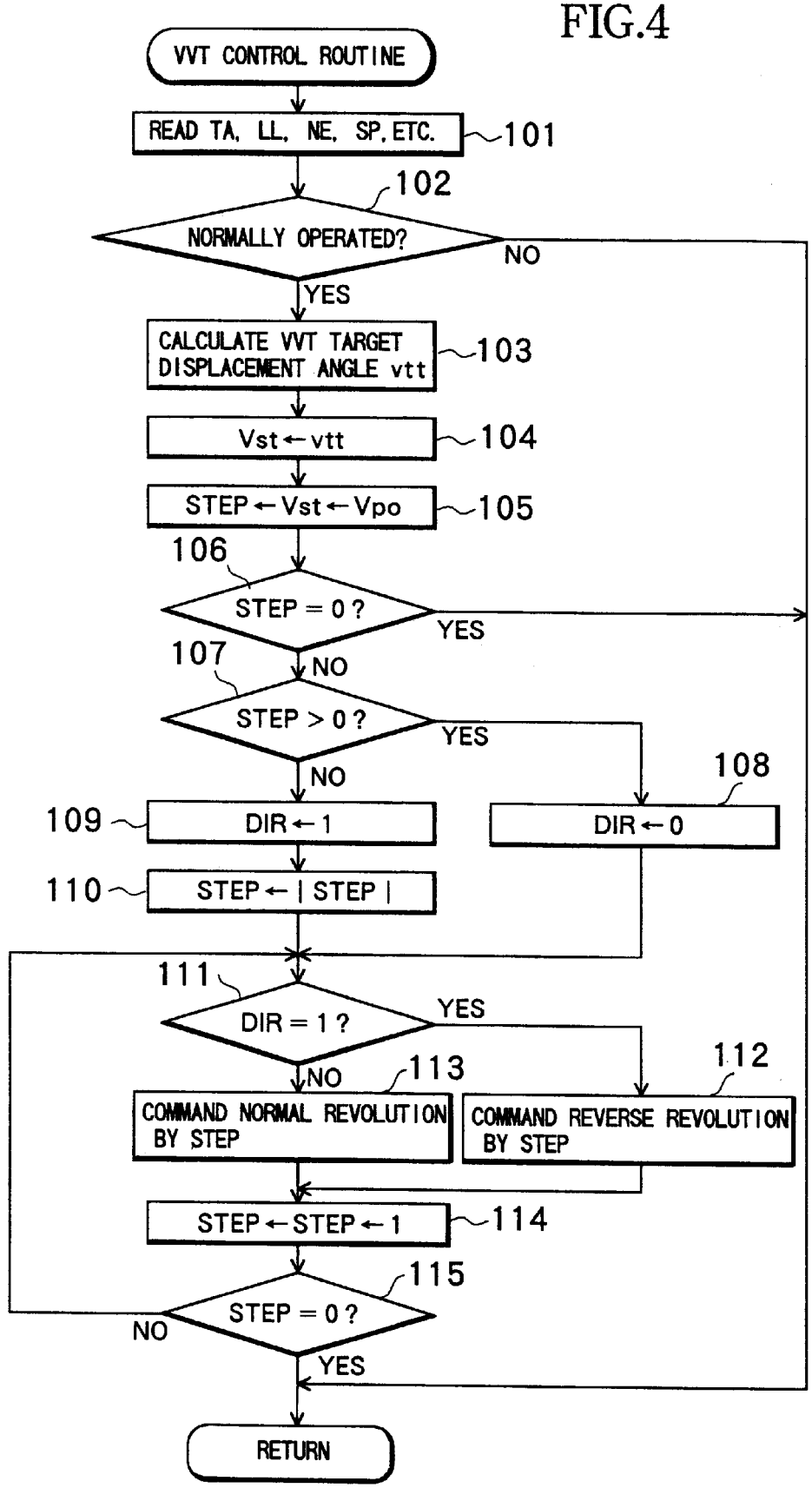
FIG. 4 is a flowchart for explanation of "VVT control routine" executed by the ECU for a variable valve timing mechanism.
Figure 5:
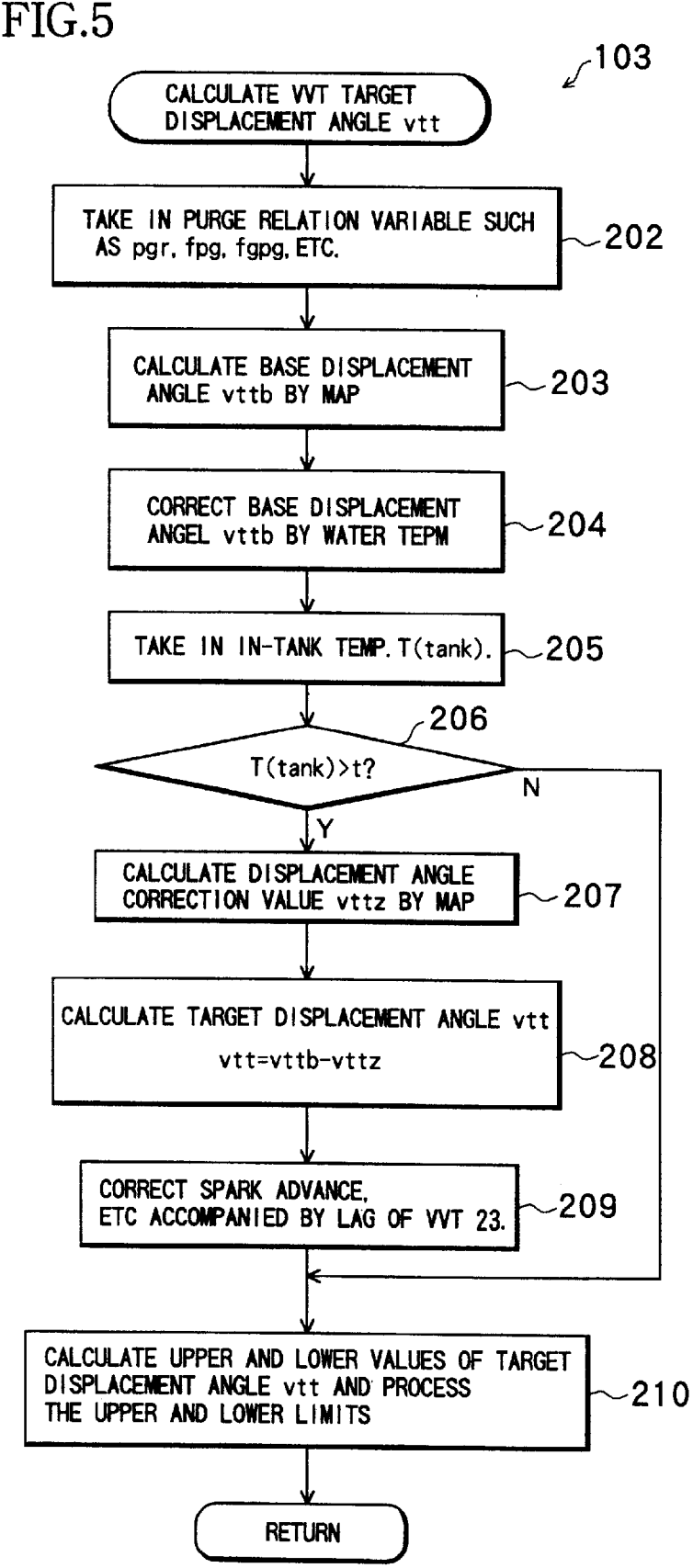
FIG. 5 is a flowchart for explanation of a routine for calculating a VVT target displacement angle vtt.

All of the operation of the respective steps in FIGS. 4 and 5 is performed by the ECU 41 for the variable valve timing mechanism.

When processing is shifted to this routine after the engine 1 is started, first in step S101 of FIG. 4, the throttle opening degree TA, the totally-closed signal LL, the engine r.p.m. NE, the vehicle speed SP, the degree of shaking G of the fuel, the fuel tank temperature T(tank), the fuel remainder Gas, the outside air temperature T(out) and so on due to the parameters detected by the throttle sensor 14, the totally-closed switch 14a, the r.p.m. sensor 30, the vehicle speed sensor 34, the G sensor 35, the fuel tank temperature sensor 36, the fuel remainder sensor 37 and the outside air temperature sensor 38 and so on are read respectively from the engine electronic control unit 40 and temporarily stored in the random access memory 52. Also, those information is always rewritten to the update information.

Sequentially, in step S102, it is judged whether a vehicle normally travels, or not, on the basis of the totally-closed signal LL, the vehicle speed SP and so on. In other words, it is judged whether the totally-closed signal LL is not on and also the vehicle speed SP is not 0, or not. Then, if it is judged that the vehicle does not normally travel, the subsequent processing is suspended once as it is.

Also, in step S102, if it is judged that the vehicle normally travels, processing is advanced to step S103 in which an optimum target displacement angle vtt of the variable valve timing mechanism 23 responsive to the engine operation state is calculated. The target displacement angle vtt is set as the valve overlap amount, which is obtained from calculation of a function employing, as the parameters, the values of the engine r.p.m. NE, the throttle opening degree TA, etc., on the basis of the engine operation state such as the engine r.p.m. NE, the throttle opening degree TA, etc., which are read in advance, and the calculation of the target displacement angle vtt will be described with reference to a subroutine shown in FIG. 5.

For that reason, the description is turned from the control routine for the variable valve timing mechanism to the calculation of the target displacement angle vtt.

As shown in FIG. 5, when processing is shifted to the routine of the target displacement angle vtt, in step S202, the parameters relating to the state of amount of purge, such as the purge ratio pgr (%), the fuel correction ratio fpg (%) by purge, the vapor concentration fgpg (%) per unit purge ratio, etc., is taken in. These parameters are obtained from another routine not shown.

Subsequently, in step S203, the base displacement angle vttb which is a base for obtaining the target displacement angle vtt is obtained from a map not shown which is stored in the read only memory 51.

In step S204, the base displacement angle vttb value is corrected according to the temperature of a cooling water. This is a treatment made because combustion is not stabilized if the cooling water for the engine 1 is too low in temperature.

In step S205, of the parameters indicating the operation state read in step S101, the temperature T(tank) within the fuel tank 80 which is one parameter indicating that the amount of generated fuel vapor discharged from the fuel tank 80 tends to increase is taken in from the random access memory 52.

In step S206, it is judged whether the in-tank temperature T(tank) (unit:°C.) is higher or lower than the target in-tank temperature t (°C.). If it is higher, the judgement is yes, and processing is advanced to step S207, but if it is lower, the judgement is no, and processing is advanced to step S210.

Figure 6:
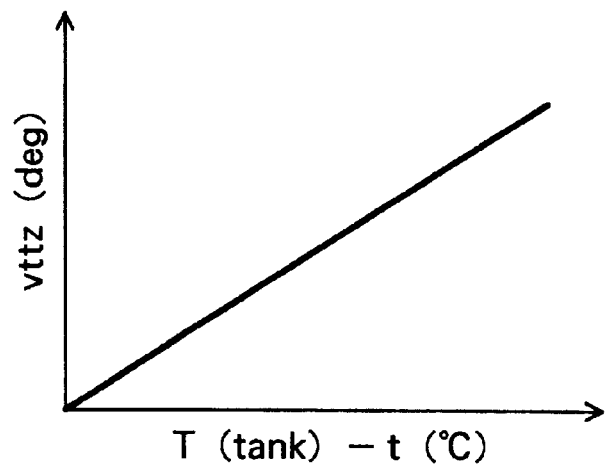
FIG. 6 is a graph showing a map for calculating a displacement angle correction value vttz.

In step S207, the displacement angle correction value vttz is calculated from the map shown in FIG. 6 on the basis of a difference between the in-tank temperature T(tank) and the target in-tank temperature t, that is, (T(tank)−t). The displacement angle correction value vttz is a correction value indicating the degree of the lag of the open timing of the intake valve 9 for strengthening the purge, and its unit is a unit "deg" indicating an angle. These terms are used hereinunder with the same meaning.

Then, in step S208, obtained is the target displacement angle vtt which is a value resulting from subtracting the displacement angle correction value vttz from the base displacement angle vttb obtained in step S203, and the processing is advanced to the subsequent step S209.

In step S209, correction is made such that the ignition timing is spark-advanced with the lag of the variable valve timing mechanism 23, etc.

Thereafter, in step S210, the calculation of the upper and lower limit values of the target displacement angle vtt and processing of the upper and lower limit values thereof are conducted to finally determine the target displacement angle vtt, and therefore the routine for obtaining the target displacement angle vtt is completed.

The description is turned to the control routine of the variable valve timing mechanism.

After the target displacement angle vtt is obtained in step S103, processing is advanced to step S104. In step S104, in order to control the drive of the step motor 25, the number Vst of the target steps of the step motor 25 corresponding to the value of the target displacement angle vtt obtained in FIG. 5 is set from the target displacement angle vtt.

Thereafter, in step S105, the result obtained by subtracting the present number of steps Vpo of the step motor 25 from the target number of steps Vst for driving the step motor 25 is set as the number of control steps STEP.

Then, in step S106, it is judged whether the number control steps STEP is 0 or not. In this situation, if the number of control steps is 0, the subsequent processing is suspended once without driving the step motor 25.

On the other hand, if the number of control steps STEP is not 0 in step S106, it is judged in step S107 whether the number of control steps STEP is larger than 0, or not, that is, whether the number of control steps STEP is a positive number, or not. In this situation, if the number of control steps STEP is the positive number, after the control flag DIR is reset to 0 in step S108, processing is shifted to step S111.

Also, if the number of control steps STEP is a negative number in step S107, a control flag DIR is set to 1 in step S109.

The control flag DIR is designed to discriminate whether the step motor 25 of the variable valve timing mechanism 23 is rotated reversely or normally by one step. If the control flag DIR is 1, the step motor 25 of the variable valve timing mechanism 23 is rotated reversely by one step, and if the control flag DIR is 0, the step motor 25 is rotated normally by one step.

Subsequently, in step S110, after an absolute value of the number of control steps STEP is set as the new number of control steps STEP, processing is shifted to step S111.

Then, in step S111 shifted from step S108 or step S110, it is judged whether the control flag DIR is 1, or not. If the control flag DIR is 1, after the step motor 25 of the variable valve timing mechanism 23 is rotated reversely by one step in step S112, processing is shifted to step S114, and if the control flag DIR is 0, after the step motor 25 is rotated normally by one step in step S113, processing is shifted to step S114.

In step S114 shifted from step S112 or step S113, the result obtained by subtracting 1 from the number of control steps STEP is set as the new number of control steps STEP.

Also, in step S115, it is judged whether the new number of control steps STEP is 0, or not. If the new number of control steps STEP is not 0, processing is jumped up to step S111, and processing of steps S111 to S115 is repeated. That is, the drive of the variable valve timing mechanism 23 is controlled.

On the other hand, if the new number of control steps STEP is 0 in step S115, processing is suspended once as it is.

In the above manner, the drive of the variable valve timing mechanism 23 is controlled by the control of the step motor 25 to control the open/close timing of the intake valve 9 as well as the amount of valve overlap.

Then, the operation and effect of the fuel vapor treating device I for the internal combustion engine thus structured will be described.

In the fuel vapor treating device I for the internal combustion engine, the calculation value of the amount of valve overlap is corrected by the ECU 41 for the variable valve timing mechanism (valve overlap amount correcting means) according to the fuel tank inside temperature T(tank) detected by the fuel tank temperature sensor 36 (fuel vapor increase tendency detecting means) that detects the fuel tank inside temperature T(tank) which is a parameter indicating that the amount of generated fuel vapor discharged from the fuel tank 80 tends to increase among the parameters indicating the operation states detected by the respective sensors 14, 30 to 38, etc., which are the operation state detecting means.

In other words, if the ECU 41 for the variable valve timing mechanism judges, before or during the purge execution made by the purge execution means, from the fuel tank inside temperature T(tank), which is an engine temperature, detected by the fuel tank temperature sensor 36 that the amount of fuel vapor discharged from the fuel tank 80 tends to increase, the ECU 41 for the variable valve timing mechanism corrects the amount of valve overlap so that the open timing of the intake valve 9 is at least lagged.

Hence, at the time where the ECU 41 for the variable valve timing mechanism judges that the amount of fuel vapor discharged from the fuel tank 80 tends to increase, the negative pressure generated in the inlet passage 7 is elevated.

For that reason, the fuel vapor can be purged from the canister 81 before the canister 81 is saturated with the fuel vapor.

Accordingly, there is no case where the canister 81 adsorbs the fuel vapor more than that saturated capacity, and therefore there is no fear that the canister 81 is caused to be overflown.

It should be noted that the present invention is not limited by or to the above respective embodiments, and a part of the structure can be appropriately varied within the limit that it is not deviated from the subject matter of the present invention as stated below.

Another Embodiment Mode 1

Another embodiment mode 1 will be described below with reference to FIGS. 7 and 8.

In the above embodiment mode, the amount of purge is promoted with the temperature T(tank) (unit:°C.) within the fuel tank 80 as a reference. Instead, if the outside air temperature T(out) is higher than a set value t (°C.) of the outside air temperature, the variable valve timing mechanism 23 is controlled so as to be lagged so that the open timing of the intake valve 9 is lagged according to a difference between the outside air temperature T and the set value t. The purge control routine in this case will be described with reference to FIG. 9. A difference between the purge control routine shown in FIG. 7 and the purge control routine shown in FIG. 5 is that steps between steps S204 and S207, that is, steps S205 and S206 are replaced by steps S305 and S306. Hence, only different portions will be described, the description of the same parts will be omitted. The same is applied to other embodiment modes 2 to 8 (except for other embodiment mode 6) which will be described later, that is, steps S205 and S206 between steps S204 and S207 in the above embodiment mode are merely replaced by other different steps.

Figure 7:
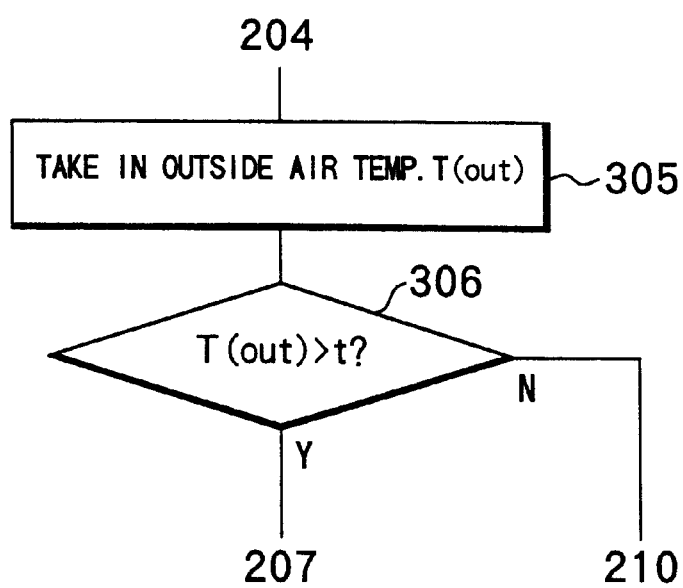
FIG. 7 is a flowchart showing a purge control routine according to another embodiment 1.
Figure 8:
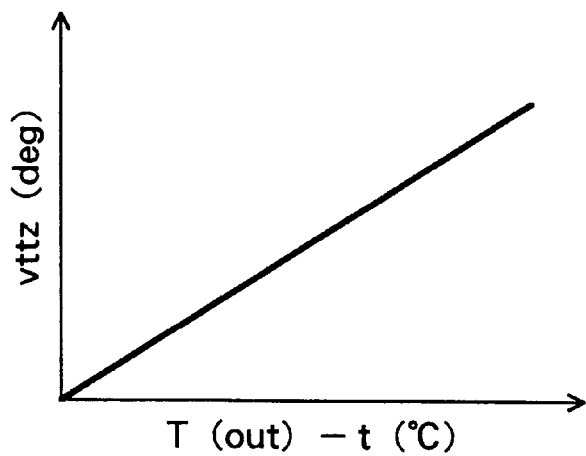
FIG. 8 is a graph showing a map for calculating a displacement angle correction value vttz according to another embodiment 1.

In step S305 in FIG. 7, the outside air temperature T(out) is taken in.

In step S306, it is judged whether the outside air temperature T(out) is higher or lower than the set value t. If it is higher, that is, if the fuel vapor tends to increase, processing is advanced to step S207. If it is lower, that is, if the fuel vapor is difficult to increase, processing is advanced to step S210, and the displacement angle correction value vttz is calculated from the map shown in FIG. 8 on the basis of a difference between the outside air temperature T(out) and the set value t, that is, (T(out)−t).

Another Embodiment Mode 2

Figure 9:
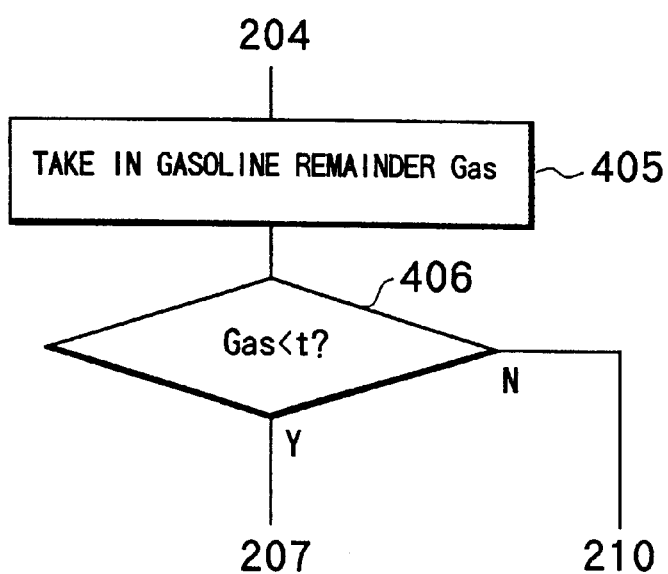
FIG. 9 is a flowchart showing a purge control routine according to another embodiment 2.
Figure 10:
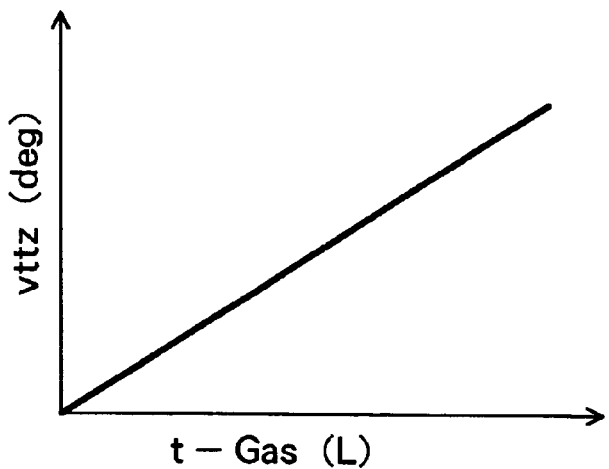
FIG. 10 is a graph showing a map for calculating a displacement angle correction value vttz according to another embodiment 2.

Another embodiment mode 2 will be described with reference to FIGS. 9 and 10.

In this embodiment mode 2, if the gasoline remainder Gas (unit: L(liter) is smaller than a set value t (unit: L) of the gasoline remainder Gas, the variable valve timing mechanism 23 is controlled to be lagged such that the open timing of the intake valve 9 is lagged according to a difference between the gasoline remainder Gas and the set value t.

The purge control routine in this case will be described with reference to FIG. 9. A difference between the purge control routine shown in FIG. 9 and the purge control routine shown in FIG. 7 is only that steps S205 and S206 in the embodiment mode are replaced by steps S405 and S406.

In step S405, the gasoline remainder Gas is taken in. In step S406, it is judged whether the gasoline remainder Gas is larger or smaller than the set value t. If it is larger, that is, if the fuel vapor is difficult to increase, processing is advanced to step S210. If it is smaller, that is, if the fuel vapor is easy to increase, processing is advanced to step S207. The displacement angle correction value vttz is calculated from the map shown in FIG. 10 on the basis of a difference between the gasoline remainder Gas and the set value t, that is, (t−Gas).

Another Embodiment Mode 3

Figure 11:
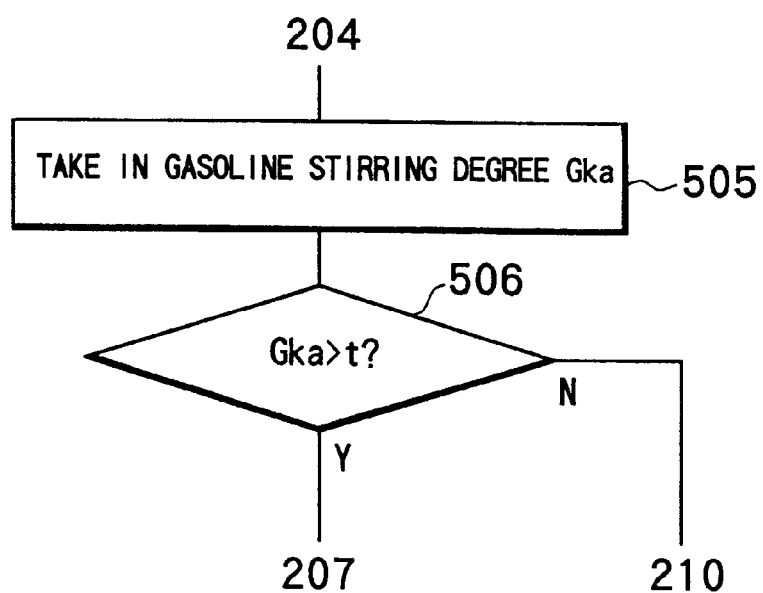
FIG. 11 is a flowchart showing a purge control routine according to another embodiment 3.
Figure 12:
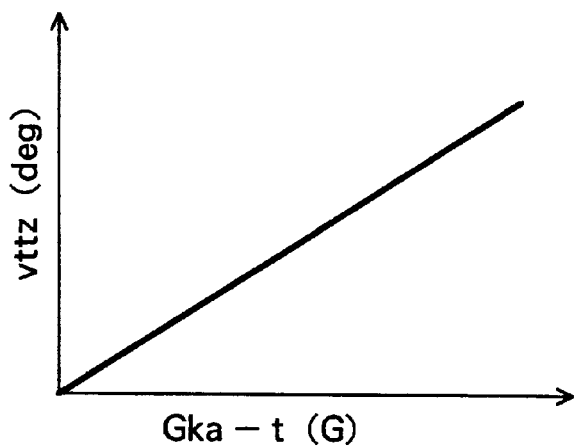
FIG. 12 is a graph showing a map for calculating a displacement angle correction value vttz according to another embodiment 3.

Another embodiment mode 3 will be described with reference to FIGS. 11 and 12.

In this embodiment mode 3, if the gasoline stirring degree (gasoline shaking degree) Gka (unit: G) is larger than a set value t of the gasoline stirring degree Gka, the variable valve timing mechanism 23 is controlled to be lagged such that the open timing of the intake valve 9 is lagged according to a difference between the gasoline stirring degree and the set value t (unit: G).

The purge control routine in this case will be described with reference to FIG. 11. A difference between the purge control routine shown in FIG. 11 and the purge control routine shown in FIG. 5 is only that steps S205 and S206 in the above-described embodiment mode are replaced by steps S505 and S506.

In step S505, the gasoline stirring degree Gka obtained from the G sensor output set in the fuel tank is taken in. In step S506, it is judged whether the gasoline stirring degree Gka is larger or smaller than the set value t. If it is smaller, that is, if the fuel vapor is difficult to increase, processing is advanced to step S210. If it is larger, that is, if the fuel vapor is easy to increase, processing is advanced to step S207. The displacement angle correction value vttz is calculated from the map shown in FIG. 12 on the basis of a difference between the gasoline stirring degree Gka and the set value t, that is, (Gka−t).

Another Embodiment Mode 4

Figure 13:
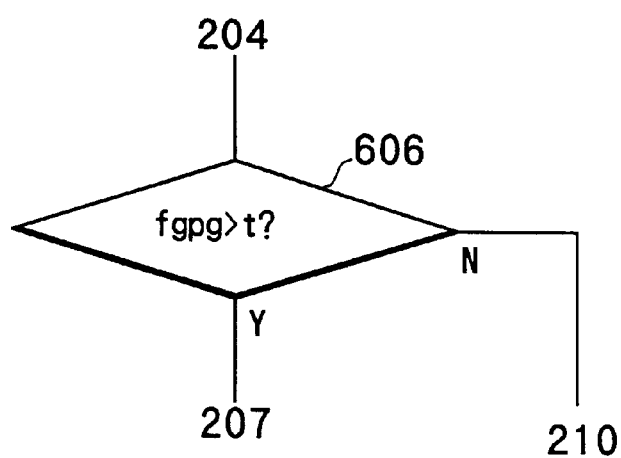
FIG. 13 is a flowchart showing a purge control routine according to another embodiment 4.
Figure 14:
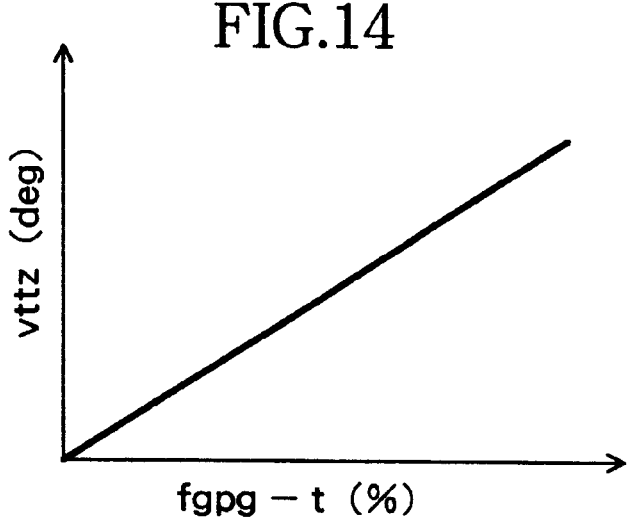
FIG. 14 is a graph showing a map for calculating a displacement angle correction value vttz according to another embodiment 4.

Another embodiment mode 4 will be described with reference to FIGS. 13 and 14.

In this embodiment mode 4, if the vapor concentration fgpg per unit purge ratio (unit: %) is larger than a set value t (unit: %) of the vapor concentration fgpg per unit purge ratio, the variable valve timing mechanism 23 is controlled to be lagged such that the open timing of the intake valve 9 is lagged according to a difference between the vapor concentration fgpg per unit purge ratio and the set value t.

The purge control routine in this case will be described with reference to FIG. 13. A difference between the purge control routine shown in FIG. 13 and the purge control routine shown in FIG. 5 is only that steps S205 and S206 in the above-described embodiment mode are replaced by step S606.

In step S606, it is judged whether the vapor concentration fgpg per unit purge ratio is larger (the purge concentration is high) or smaller (purge concentration is low) than the set value t. If it is smaller, the judgement is no, and processing is advanced to step S210. If it is larger, the judgement is yes, and processing is advanced to step S207. The displacement angle correction value vttz is calculated from the map shown in FIG. 14 on the basis of a difference between the vapor concentration fgpg per unit purge ratio and the set value t, that is, (fgpg−t).

Another Embodiment Mode 5

Figure 15:
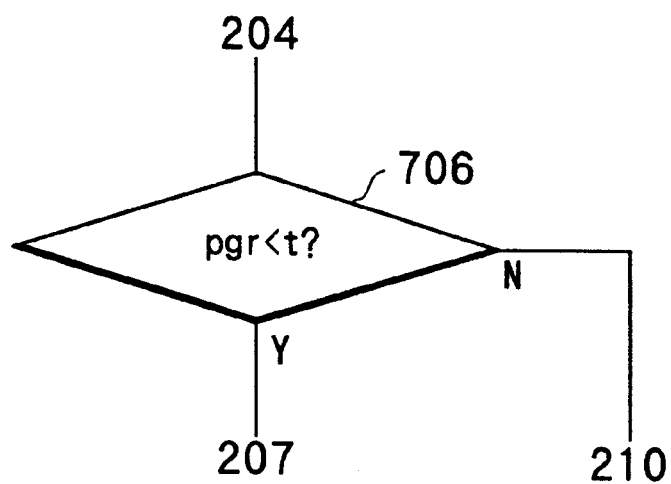
FIG. 15 is a flowchart showing a purge control routine according to another embodiment 5.
Figure 16:
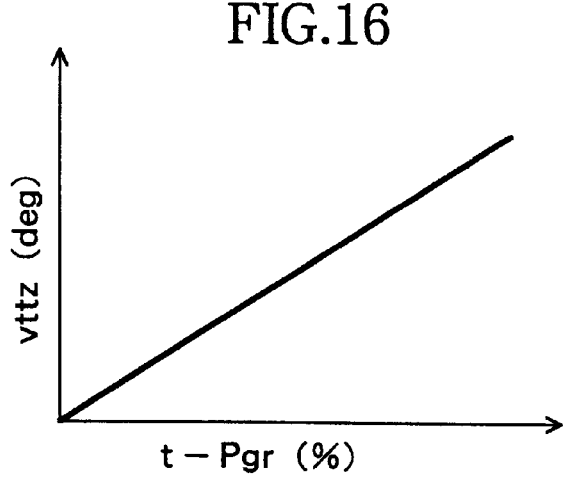
FIG. 16 is a graph showing a map for calculating a displacement angle correction value vttz according to another embodiment 5.

Another embodiment mode 5 will be described with reference to FIGS. 15 and 16.

In this embodiment mode 5, if the purge ratio pgr (unit: %) is smaller than a set value t (unit: %) of the purge ratio pgr, the variable valve timing mechanism 23 is controlled to be lagged such that the open timing of the intake valve 9 is lagged according to a difference between the purge ratio pgr and the set value t.

The purge control routine in this case will be described with reference to FIG. 15. A difference between the purge control routine shown in FIG. 15 and the purge control routine shown in FIG. 5 is only that steps S205 and S206 in the embodiment mode are replaced by step S706.

In step S706, it is judged whether the purge ratio pgr taken in step S202 of the above embodiment mode is larger or smaller than the set value t. If it is larger, the judgement is no, and processing is advanced to step S210. If it is smaller, the judgement is yes, and processing is advanced to step S207, in which the displacement angle correction value vttz is calculated from the map shown in FIG. 16 on the basis of a difference between the purge ratio pgr and the set value t, that is, (t−pgr).

Another Embodiment Mode 6

Figure 17:
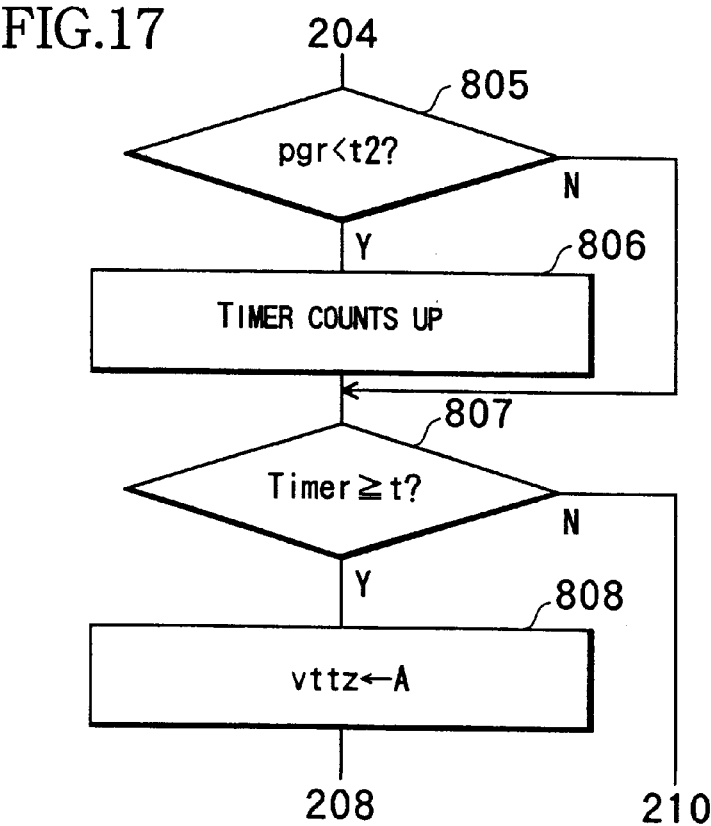
FIG. 17 is a flowchart showing a purge control routine according to another embodiment 6.

Another embodiment mode 6 will be described with reference to FIG. 17.

In this embodiment mode 6, when a period of time during which the purge ratio pgr does not satisfy a target value of the purge ratio pgr lasts a predetermined period of time or longer, the variable valve timing mechanism 23 is controlled to be lagged such that the open timing of the intake valve 9 is lagged.

The purge control routine in this case will be described with reference to FIG. 17. A difference between the purge control routine shown in FIG. 17 and the purge control routine shown in FIG. 5 is only that steps S205, S206 and S207 in the above embodiment mode are replaced by steps S805, S806, S807 and S808.

In step S805, it is judged whether the purge ratio pgr (unit: %) taken in step S202 of the above embodiment mode is larger or smaller than a predetermined set value t2 (unit: %). If it is smaller, the judgement is yes, and processing is advanced to step S806, in which a predetermined timer not shown counts up, and processing is then advanced to step S807. If pgr is larger than t2 in step S805, the judgement is no, and processing is advanced directly to step S807.

In step S807, a value of the timer (unit: sec) is compared with the predetermined set value t (unit: sec), and if the value of the timer is smaller than the set value t, the judgement is no, and processing is advanced to step S210, but if the former is equal to or larger than the latter, the judgement is yes, and processing is advanced to step S808.

In step S808, a predetermined value A (unit: deg) is substituted for the displacement angle correction value vttz (unit: deg), and thereafter processing is advanced to step S208.

Another Embodiment Mode 7

Figure 18:
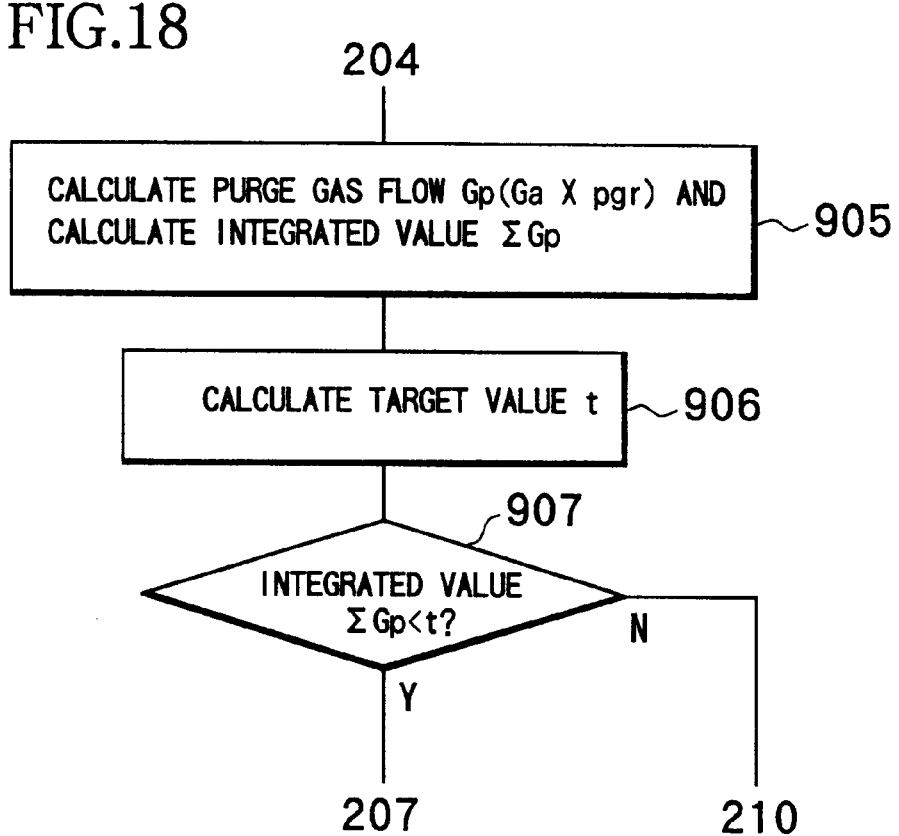
FIG. 18 is a flowchart showing a purge control routine according to another embodiment 7.
Figure 19:
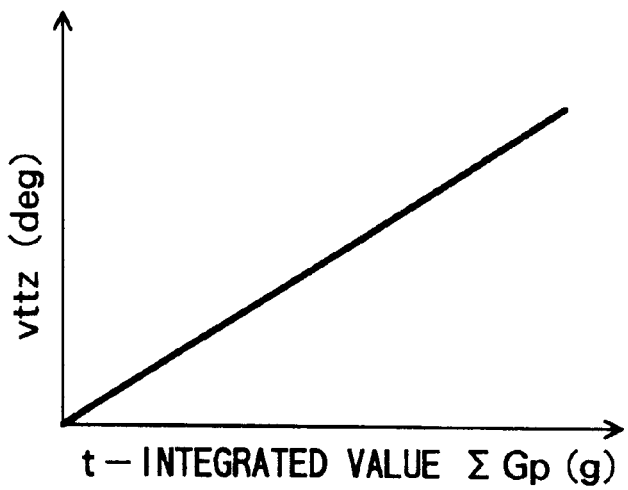
FIG. 19 is a graph showing a map for calculating a displacement angle correction value vttz according to another embodiment 7.

Another embodiment mode 7 will be described with reference to FIGS. 18 and 19.

In this embodiment mode 7, when ΣGp (unit: g), a integrated value of the purge gas flow Gp does not satisfy a predetermined set value t (unit: g), the variable valve timing mechanism 23 is controlled to be lagged such that the open timing of the intake valve 9 is lagged according to a difference between the integrated value of the purge gas flow ΣGp and the set value t.

The purge control routine in this case will be described with reference to FIG. 18. A difference between the purge control routine shown in FIG. 18 and the purge control routine shown in FIG. 5 is only that steps S205 and S206 in the above embodiment mode are replaced by steps S905, S906 and S907.

In step S905, the purge gas flow Gp is calculated from the purge ratio pgr taken in step S202 of the above embodiment mode and the engine intake air flow Ga, and thereafter an integrated value ΣGp of the purge gas flow Gp is calculated.

In step S906, the set value t of the integrated value ΣGp is read out from the read only memory 51, and subsequently in step S907, it is judged whether the integrated value ΣGp is larger or smaller than the set value t. If it is larger, the judgement is no, and processing is advanced to step S210. If it is smaller, the judgement is yes, and processing is advanced to step S207, and the displacement angle correction value vttz is calculated from the map shown in FIG. 19 on the basis of a difference between the integrated value ΣGp and the set value t, that is, (t−ΣGp).

Another Embodiment Mode 8

Figure 20:
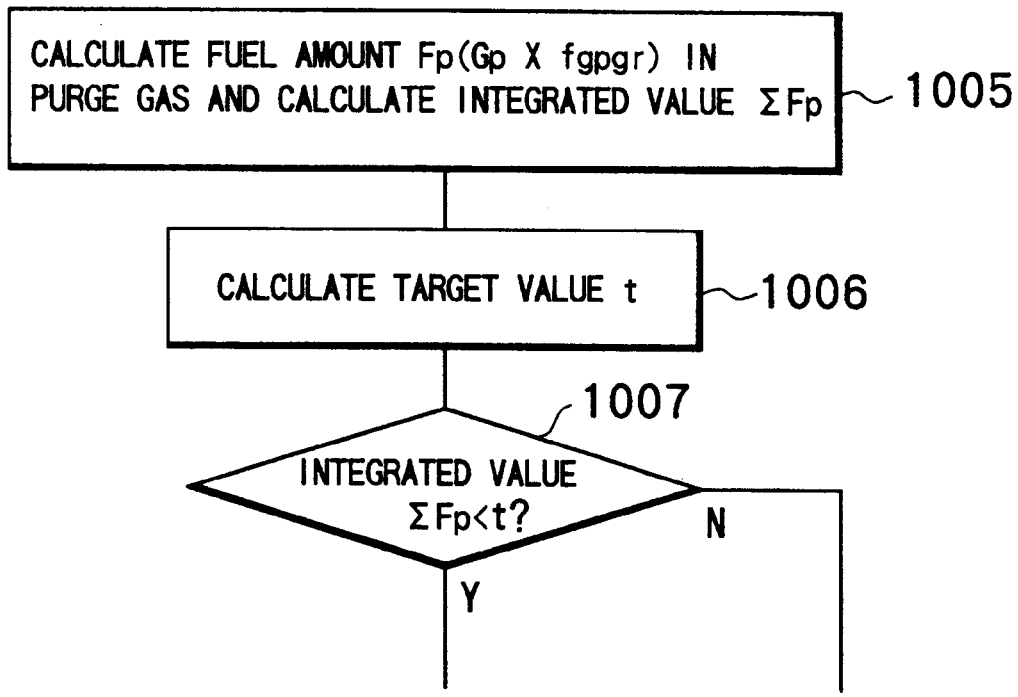
FIG. 20 is a flowchart showing a purge control routine according to another embodiment 8.
Figure 21:
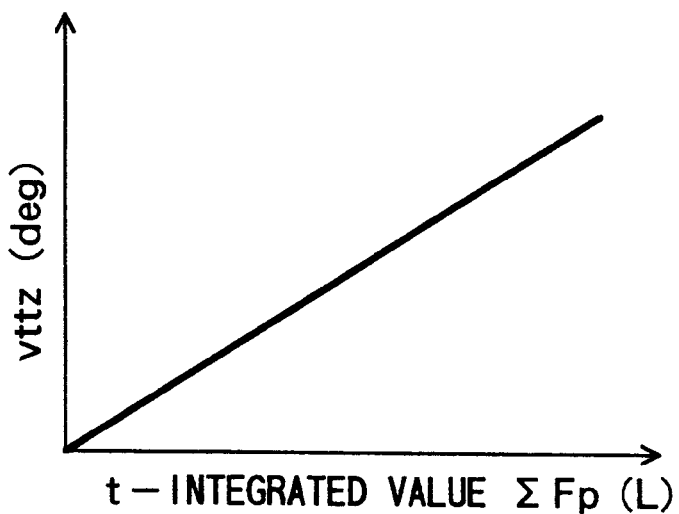
FIG. 21 is a graph showing a map for calculating a displacement angle correction value vttz according to another embodiment 8.

Another embodiment mode 8 will be described with reference to FIGS. 20 and 21.

In this embodiment mode 8, when an integrated value ΣFp (unit: L(litter)) of the fuel amount Fp (obtained by a product of the purge gas flow p and the vapor concentration fgpg per unit page ratio) contained in the fuel vapor does not satisfy a set value t, the variable valve timing mechanism 23 is controlled such that the open timing of the intake valve 9 is lagged, on the basis of a difference between ΣFp and the set value t.

The purge control routine in this case will be described with reference to FIG. 20. A difference between the purge control routine shown in FIG. 20 and the purge control routine shown in FIG. 7 is only that steps S205 and S206 in the above embodiment mode are replaced by steps S1005, S1006, and S1007.

In step S1005, the purge gas flow Gp is calculated from the purge ratio pgr taken in step S202 of the above embodiment mode and the engine intake air flow Ga, and thereafter the fuel amount Fp contained in the fuel vapor is calculated according to the integration of the purge gas flow Gp and the vapor concentration fgpg per unit page ratio. Then, the integrated value ΣFp of the fuel amount Fp contained in the fuel vapor is calculated.

In step S1006, the set value t of the integrated value ΣFp is calculated.

In step S1007, it is judged whether the integrated value ΣFp is larger or smaller than the set value t. If it is larger, the judgement is no, and processing is advanced to step S210. If it is smaller, the judgement is yes, and processing is advanced to step S207, and the displacement angle correction value vttz is calculated from the map shown in FIG. 21 on the basis of a difference between the integrated value ΣFp and the target value t, that is, (t−ΣFp).

Likewise, in other embodiment modes 1 to 8, various parameters indicating that the engine 1 is in a state where the fuel vapor can be generated are detected at times so that it is estimated in advance that the purge amount of the evaporated fuel is generated more than the capacity of the canister 81, and the purge is promoted on the basis of that estimate so that the fuel vapor of a predetermined amount or more is prevented from being adsorbed by the canister.

Also, in the above respective embodiments, a case in which only the open timing of the intake valve 9 is variable by the variable valve timing mechanism 23 is embodied. Alternatively, a case in which the close timing of the intake valve 9 is made variable by the variable valve timing mechanism may be embodied, or both of the close and open timings of the intake valve 9 are made variable by the variable valve timing mechanism may be embodied.

In the above-described embodiments and other embodiment modes, there is applied the inlet-side variable valve timing mechanism 23 with the step motor 25 as a drive source. Instead, a hydraulically driven variable valve timing mechanism may be applied.

Also, in the above-described embodiments and other embodiment modes, the gasoline engine is embodied, but a diesel engine may be also applied.

Further, in the above-described respective embodiments, the open and close timing, that is, a reference of the amount of spark advance of the valve (displacement amount) is a state (the most lag state) in which the open and close timing of the intake valve is the latest, but the present invention is not limited to or by this. It is needless to say that the reference is appropriately set for each internal combustion chamber, and for that reason, the present invention is applicable to any known variable valve timing mechanisms.

Still further, in the above-described respective embodiments, that the fuel vapor adsorbed by the canister is purged by the inlet tube was described. Alternatively, a case in which the fuel vapor to be purged is not adsorbed by the canister, and the fuel vapor purged directly to the inlet tube from the fuel tank is contained is also applicable. Further, the present invention is applicable to an internal combustion engine in which the fuel vapor is purged directly to the inlet tube from the fuel tank without any provision of the canister.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An evaporated fuel treatment device for an internal combustion engine, comprising:

a variable valve timing mechanism that varies the open/close timing of at least an intake valve among the intake valve and an exhaust valve of the internal combustion engine;

operation state detecting means for detecting the operation state of said internal combustion engine;

drive control means for calculating the amount of valve overlap of said intake valve and said exhaust valve on the basis of a detection result of the operation state detecting means to control the drive of said variable valve timing mechanism according to the amount of the calculated valve overlap;

purge executing means for purging the fuel vapor discharged from a fuel system of said internal combustion engine to an inlet passage in response to an operating state of the internal combustion engine;

fuel vapor increase tendency detecting means for detecting before or during execution of purge by the purge executing means a parameter indicative that the amount of generation of the fuel vapor discharged from said fuel system tends to increase, among parameters indicative of the operation state detected by said operation state detecting means; and valve overlap amount correcting means for correcting the amount of valve overlap calculated by said drive control means according to the parameter detected by the fuel vapor increase tendency detecting means.

2. An evaporated fuel treatment device for an internal combustion engine as claimed in claim 1, wherein said parameter is a parameter that represents a state in which the fuel vapor is generated in the fuel tank of said fuel system.

3. An evaporated fuel treatment device for an internal combustion engine as claimed in claim 1, wherein said parameter is a parameter relating to a state of amount of purge.

4. An evaporated fuel treatment device for an internal combustion engine as claimed in claim 1, wherein said purge executing means comprises a purge passage for directing the evaporated fuel generated in the fuel tank to a intake passage of the internal combustion engine, and a purge control valve to close and open the purge passage for controlling an amount of purge based on an operating state of the internal combustion engine.

5. An evaporated fuel treatment device for an internal combustion engine as claimed in claim 3, wherein said parameter relating to the state of amount of purge includes at least one of a purge ratio, a vapor concentration, a purge gas amount, a fuel correction amount by purging and a period of time during which the purge is executed.

6. An evaporated fuel treatment device for an internal combustion engine as claimed in claim 4, wherein a canister, which temporarily adsorbs the evaporation fuel emitted from the fuel tank, is interposed between the fuel tank and the intake passage of the internal combustion engine, said canister is communicated with the intake passage through the purge passage, and the canister is communicated with the fuel tank through an introducing passage which leads the evaporated fuel emitted from the fuel tank to the canister.

7. An evaporated fuel treatment device for an internal combustion engine as claimed in claim 1, wherein the purge executing means effects the purging of the evaporated fuel emitted from the fuel tank into the intake passage by employing a negative pressure generated in the intake passage.

8. An evaporated fuel treatment device for an internal combustion engine as claimed in claim 2, wherein said parameter that represents the state in which the fuel vapor is generated in the fuel tank is detected by tank state detection means for detecting the state of the fuel tank.

9. An evaporated fuel treatment device for an internal combustion engine as claimed in claim 8, wherein said tank state detecting means includes at least one of a G sensor for sensing a degree of shaking of the fuel tank, a fuel tank temperature sensor for detecting a temperature in the fuel tank, a fuel remainder sensor for detecting the fuel remainder in the fuel tank, and an outside air temperature sensor for detecting the outside air temperature.

10. An evaporated fuel treatment device for an internal combustion engine as claimed in claim 1, wherein an amount of purge effected by the purge executing means is controlled based on a purge ratio which is a volume flow ratio of the purge gas flow to the total intake air flow.

11. An evaporated fuel treatment device for an internal combustion engine as claimed in claim 1, wherein the valve overlap amount is set based on a displacement angle which is calculated on the basis of the operating state of the internal combustion engine.

12. An evaporated fuel treatment device for an internal combustion engine as claimed in claim 11, wherein said displacement angle is corrected based on an engine temperature.

13. An evaporated fuel treatment device for an internal engine as claimed in claim 11, wherein the displacement angle is calculated from at least an engine revolutions speed and a degree of open of the throttle.

14. An evaporated fuel treatment device for an internal combustion engine as claimed in claim 1, wherein, when the parameter detected by said evaporation fuel increase tendency detecting means indicates that the amount of generation of the evaporation fuel tends to increase, a valve overlap amount is corrected by a valve overlap amount correction mean so as to lag the open timing the open timing of the air intake valve.

15. An evaporated fuel treatment device for an internal combustion engine as claimed in claim 1, wherein, when the increase of evaporation fuel is detected by said fuel vapor increase tendency detecting means, said valve overlap amount correcting means corrects the amount of valve overlap of said intake valve and said exhaust valve so that the overlap amount is made smaller.

* * * * *